Oct. 25, 1960
O. L. NORDIN
2,957,484
INJECTOR APPARATUS AND METHODS OF INJECTING A SLURRY INTO A PIPELINE
Filed April 25, 1956
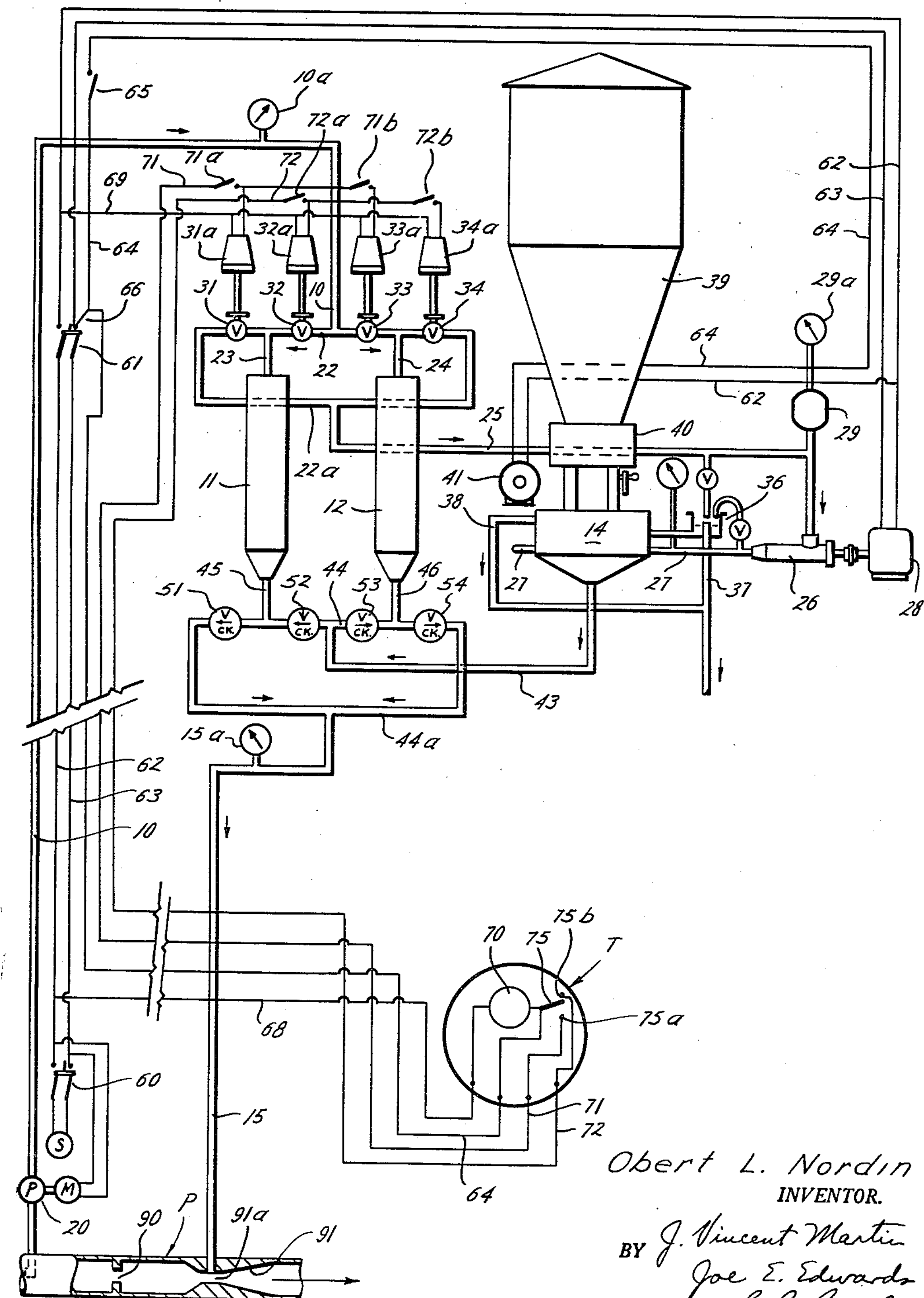
Obert L. Nordin
INVENTOR.
BY J. Vincent Martin
Joe E. Edwards
B. R. Pravel
ATTORNEYS United States Patent Office 2,957,484

Patented Oct. 25, 1960

2,957,484

INJECTOR APPARATUS AND METHODS OF INJECTING A SLURRY INTO A PIPELINE

Obert L. Nordin, Houston, Tex., assignor to Thornhill-Craver Company, Inc., Houston, Tex., a corporation of Texas Filed Apr. 25, 1956, Ser. No. 580,543

13 Claims. (Cl. 137—1)

This invention relates to new and useful improvements in injector apparatus and methods of injecting a slurry into a pipeline.

In copending United States patent application, Serial No. 403,712, of John E. Loeffler and Obert L. Nordin, filed July 14, 1954, now Patent No. 2,767,138 the withdrawal of a portion of a liquid flowing in a pipeline, the mixture therewith of a solid filter material or the like to form a slurry, and the subsequent injection of the slurry back into the pipeline is disclosed. This invention relates to an improvement on such procedure which is particularly suitable for use with fluids flowing in a pipeline at relatively high pressures.

It is therefore an object of this invention to provide a new and improved method and apparatus for the injection of a slurry into a pipeline in which fluid is flowing at relatively high pressures.

An important object of this invention is to provide a new and improved method and apparatus for accomplishing the withdrawal of liquid from a pipeline at relatively high pressure, forming a slurry by mixing filter material with the withdrawn liquid at substantially atmospheric pressure, and also utilizing the relatively high pressure of the withdrawn liquid for injecting the slurry into the pipeline.

Another object of this invention is to provide a new and improved method and apparatus for withdrawing a portion of liquid flowing in a pipeline at a predetermined pressure, and then causing the pressure of the withdrawn liquid to be sufficiently greater than the pressure of the liquid in the pipeline to permit the use of such withdrawn liquid for injecting a slurry into the pipeline under pressure.

Another object of this invention is to provide a new and improved method and apparatus for injecting a slurry into a pipeline under pressure without requiring a pump to handle the slurry at any time.

A further object of this invention is to provide a method and apparatus for forming a slurry by mixing filter material and a portion of the liquid flowing in a pipeline, and for thereafter injecting the slurry into the pipeline at a pressure slightly greater than the pressure of the liquid flowing in the pipeline and with the additional power required for such injection being only fractional as compared to the pressure of the liquid in the pipeline.

The construction designed to carry out the invention will be hereinafter described, together with other features thereof.

The invention will be more readily understood from a reading of the following specification and by reference to the accompanying drawing forming a part thereof, wherein an example of the invention is shown, and wherein the single figure of the drawing illustrates the apparatus of this invention which is adapted to be used in carrying out the method of this invention.

In the drawing, the letter P designates a section of a pipeline through which a fluid such as a petroleum liquid is flowing under pressure. Briefly, this invention involves the withdrawal of fluid from the pipeline P through a flow line 10 for handling by injection chambers or cylinders 11 and 12 to effect the mixing with a particulate or filter material in a mixing chamber 14 to form a slurry and for the injection of such slurry into the pipeline P through a return flow line 15. Such injection of the slurry is accomplished with a minimum power requirement even though the slurry is formed in the mixing chamber 14 at substantially atmospheric pressure. Additionally, as will be more evident hereinafter, the foregoing injection of the slurry into the pipeline P is carried out without requiring the use of a pump for handling the rough abrasive slurry.

Considering the invention more in detail, it can be seen from the drawing that the inlet flow line 10 has a pressure gauge 10*a* therewith to indicate the pressure of the liquid flowing in the inlet flow line 10. A pump 20 is also provided in the line 10 to raise the pressure of the fluid coming from the pipeline P to a point which is greater than the pressure of the fluid flowing in the pipeline P so that such differential in pressure can be utilized for the injection of the slurry through the return line 15, as will be explained. The inlet flow line 10 is in fluid communication with a manifold inlet line 22 which has valves 31, 32, 33 and 34 therein which are motor operated by motors 31*a*, 32*a*, 33*a* and 34*a*, respectively. Such motor-controlled valves are, of course, well known.

Between the valves 31 and 32, there is an inlet flow line 23 which leads to the injection chamber or cylinder 11. Similarly, between the valves 33 and 34 there is an inlet flow line 24 which leads to the injection chamber or cylinder 12. Thus, when the valve 32 is open, fluid can flow from the inlet flow line 10 through the manifold 22, through the inlet line 23 and into the chamber or cylinder 11. Similarly, when the valve 33 is open, fluid can flow from the inlet flow line 10 through the manifold 22, the inlet line 24 and into the chamber or cylinder 12.

The lower leg 22*a* of the manifold 22 is connected with a pipe 25 which extends to a mixing pump 26. The mixing pump conducts fluid through the line 27 to the mixing chamber 14 where such fluid is preferably forced into the chamber 14 at spaced locations around the drum or chamber 14. A motor 28 is utilized for driving the pump 26. It should be noted that the power requirements for the pump 26 are very nominal since it is only required to transport the fluid from one of the injection chambers 11 or 12 to the mixing chamber 14, as will be explained more in detail.

The pump 26 has connection with a suction surge chamber 29 which has a pressure valve 29*a*, therewith, the purpose of the chamber 29 being to provide a source of liquid to prevent the pump 26 from running without liquid at any time, and the purpose of which will be more evident hereinafter. An overflow pan 36 is connected to the mixing tank 14 so as to provide a limited reservoir to compensate for differences in the volumes of the liquids handled during the various operations. Overflow pipes 37 and 38 are connected to the overflow reservoir 36 and the mixing chamber 14, respectively, to carry any excess overflow to a sump or discharge (not shown).

The mixing chamber 14 is itself standard equipment and is preferably of the type shown in the aforesaid copending patent application, Serial No. 403,712. The liquid which is added to the mixing chamber 14 from the pump 26 is mixed with a particulate or filter material which is fed from a conventional hopper 39 through a conventional feeder 40 which is operated by a feeder motor 41. Such construction is well known and it is disclosed in said copending patent application. The particulate material which is mixed with the liquid in the mixing chamber 14 is preferably a filter material such as described in said copending patent application, but the invention hereof is not limited to the use of the particular filter materials disclosed in said application.

The lower end of the mixing chamber 14 has a pipe 43 extending therefrom and which is in fluid communication with a manifold 44 disposed below the injection chambers or cylinders 11 and 12. Such manifold pipe 44 has check valves 51, 52, 53 and 54 mounted therein for controlling fluid flow in a manner to be hereinafter described. It will be noted that the check valves 51 and 52 permit fluid flow only in a direction to the left whereas check valves 53 and 54 permit fluid flow only in a direction to the right, as viewed in the drawings. An outlet pipe 45 is connected to the lower end of the chamber or cylinder 11 and is in communication with the manifold pipe 44 between the check valves 51 and 52. Similarly, outlet line 46 establishes communication between the lower end of the cylinder 12 and the manifold 44 between the check valves 53 and 54. The lower leg 44a of the manifold 44 is in fluid communication with the return flow line 15. Such flow line 15 has a pressure gauge 15a connected therewith to indicate the pressure of the fluid flowing in the line 15.

The electrical circuit for supplying power to the motors for the pumps 20 and 26 and also for the feeder motor 41, and for controlling the operation of the valves 31, 32, 33 and 34, is shown in the drawings schematically. The electrical power is supplied from the source S which, of course, may be any standard source of electrical power, through the switches 60 and 61 which are connected in the electrical lines 62 and 63. Such lines 62 and 63 lead to the motor 28 which drives the pump 26. The line 64 has a switch 65 therein and such line is connected to the electrical lines 63 through the wire 66 so that power is supplied to the electrical feed motor 41 through electrical lines 62 and 64. Electrical wire 62 has connected therewith electrical wire 68 which extends to a conventional timer motor mechanism 70 which is positioned in a conventional timer device T. The electrical wire 64 is also connected to the timer motor mechanism 70. Leading from the timer T are electrical wires 71 and 72 which extend to the motors 31a 32a, 33a and 34a which operate the valves 31, 32, 33 and 34, respectively. A power lead 69 which comes from the electrical wire 62 also connects with the motors 31a, 32a, 33a and 34a. The line 71 has switches 71a and 71b therein, if desired, and it actually connects with only the motors 31a and 33a for a purpose to be hereinafter described. Similarly, the electrical wire 72 has switches 72a and 72b therein and such line 72 actually connects with only the motors 32a and 34a, the purpose of which will be hereinafter described. It should be noted that an internal switch 75 is provided in the timer T and such switch 75 is operated in a timed sequence by the timer motor 70 so that it periodically contacts the switch contact 75a to complete the circuit with the electrical wire 71 and is periodically switched to engage the electrical contact 75b to complete the circuit with the electrical wire 72. Thus, power is supplied alternately through a timed sequence to valves 31a and 33a and to motors 32a and 34a. The particular timer T which is schematically illustrated in the drawing is of conventional construction, and of course, any known type of timer which will alternately close the circuits with the electrical wires 71 and 72 can be used. The periods of time for the closing of the circuits to the valves 31a and 33a and to the valves 32a and 34a is in accordance with the particular filling and discharging from the cylinders 11 and 12, as will be explained.

In carrying out the method of this invention, a portion of the fluid which is flowing under pressure in the pipeline P is withdrawn through the inlet flow line 10, and preferably the pump 20 raises the pressure of the fluid after it has been withdrawn so that the pressure indicated on the gauge 10a is slightly greater than the pressure in the pipeline P. Assuming that the apparatus of this invention has previously been in operation, one of the injection chambers or cylinders 11 is initially filled with slurry which has been obtained from the mixing chamber 14, as will be explained. The other chamber or cylinder 12 is filled with the clear liquid which has been previously withdrawn from the pipeline P. The electrical switches 60, 61, 65, 71a, 71b, 72a and 72b are all closed to place the several pumps and motors in operation. The valves 31, 32, 33 and 34 are closed at the beginning of the operation under the conditions previously described. The switch 75 is in engagement with the electrical contact 75b so as to supply power through the line 72 to the motors 32a and 34a. Such power effects an operation of the motors 32a and 34a to open the valves 32 and 34, respectively.

When the valve 32 is opened, the fluid from the inlet flow line 10 flows through the manifold 22, the inlet pipe 23 and into the injector chamber or cylinder 11. Such fluid is under pressure as previously described and it therefore forces the slurry in the cylinder 11 downwardly through the outlet or discharge pipe 45, then through the check valve 51 and the lower leg 44a of the manifold 44 for discharge or return through the return flow line 15 to the pipeline P. Since the pressure of the fluid flowing into the cylinder 11 was slightly greater than the pressure of the pipeline P by reason of the pump 20, the fluid slurry is readily injected into the pipeline P even though the pipeline P has fluid flowing therein under pressure. It will be observed that the check valve 52 prevents any flow of the slurry in a direction to the right from the outlet pipe 45 during the time that such slurry is passing through the check valve 51 to the return line 15. The admission of the fluid from the inlet flow line 10 into the cylinder 11 is continued until all of the slurry which was previously in the cylinder 11 has been discharged therefrom. At that time, the timer motor 70 operates to change the switch 75 to a position in contact with the terminal 75a so as to close the valve 32 and open the valve 31.

However, prior to the switching of the valve 32 to a closed position and the valve 31 to an open position, the cylinder 12 is being filled with slurry from the mixing chamber 14. Such filling of the chamber or cylinder 12 with the slurry is accomplished substantially simultaneously with the discharge of the slurry from the cylinder 11. Thus, at the time that the valve 32 was initially opened, the valve 34 was also opened and thereby the cylinder 12 was placed in communication with the lower leg 22a of the manifold 22, the flow pipe 25 and the pump 26. The pump 26 applies a suction or reduced pressure through the line 25 and the line 24 to the cylinder 12 to withdraw the fluid from the cylinder 12. Such fluid which is withdrawn is, as previously explained, ordinarily clear fluid which has come from the pipeline P and has previously been admitted to the cylinder 12 in a manner similar to that described previously in connection with cylinder 11. As the substantially clear liquid is withdrawn from the cylinder 12, a reduced pressure is created in the cylinder 12 so as to draw slurry from the mixing chamber 14 through the pipe 43, check valve 53, pipe 46 and into the cylinder 12. The slurry in the mixing chamber 14 is a slurry which, of course, has been previously formed by the addition or feeding of the particulate or filter material from the hopper 39. Such particulate or filter material is fed into the mixing chamber 14 at a predetermined feed rate through the feeding mechanism 40 which is operated by the motor 41 so as to obtain the desired consistency of the slurry in the mixing chamber 14. Thus, as the substantially clear liquid is withdrawn from the cylinder 12 by means of the pump 26, it is being injected into the mixing chamber 14 with the pipe 27 so as to form an additional amount of slurry to replace the amount of slurry which is drawn into the lower end of the cylinder 12. The slurry entering the cylinder 12 takes the place of the substantially clear liquid which is withdrawn from the upper end of the cylinder 12. In that manner, the slurry in the mixing chamber 14 is constantly replenished and the injection cylinder 12 is filled with a charge of slurry.

When the cylinder 12 is full of slurry, the valve 34 is closed and the valve 33 is opened. Such is accomplished when the timer switch 75 moves from the electrical contact terminal **75*b* to the electrical contact terminal 75*a***.

It will thus be evident that the discharge of the slurry from the cylinder 11 is accomplished simultaneously with the filling of the cylinder 12 with slurry and then the valves are switched so that the reverse operation takes place, namely, the filling of the cylinder 11 with slurry and the discharge of the slurry from the cylinder 12. Such switching of the valves is effected by the timer mechanism T when the timer motor 70 operates the timer switch 75 after a predetermined period of time. Such timing of course is predetermined in accordance with the time which it takes to discharge cylinder 11 and to fill the cylinder 12.

The foregoing method or procedure can be repeated indefinitely so that a substantially continuous injection of slurry into the pipeline P is accomplished with a discharge of slurry from one of the cylinders 11 and 12 at a time. It should be pointed out that while the injection cylinder 11 is being discharged, it is subjected to the liquid from the pipeline P which is under pressure, or at a slightly greater pressure due to the pump 20, whereas the other cylinder 12 which is being filled with slurry is at substantially atmospheric pressure because the mixing chamber 14 is at substantially atmospheric pressure. Thus, the tanks 11 and 12 are alternately subjected to the pressure of substantially the pressure of the fluid in the pipeline P and to atmospheric pressure. When the cylinders 11 and 12 are subjected to the pressure of the fluid in the pipeline P, or the substantially greater pressure by reason of the pump 20, a larger volume of the liquid is admitted into the cylinders 11 and 12 than is subsequently admitted when slurry is added or introduced into the lower ends of the cylinders 11 and 12 from the mixing chamber 14 at atmospheric pressure. The excess volume of the clear liquid causes an excess of liquid to flow into the mixing chamber 14 and for that reason the overflow reservoir 36 is provided to maintain a constant level in the mixing chamber 14. The overflow of the excess liquid is discharged to a sump or is otherwise used as it passes from the lines 37 and 38, shown in the drawing. Such excesses, of course, are relatively small compared to the total volumes of the cylinders 11 and 12 since the expansion of the cylinders 11 and 12 is relatively small, but of course such amount of excess depends to a certain extent upon the pressure of the fluid in the pipeline P and the pressure at which the fluid is introduced into the upper ends of the cylinders 11 and 12 for the discharge of the slurry therefrom.

In order to be certain that there is no flow between the tanks 11 and 12 during the switching of the valves 31, 32, 33 and 34, it is preferable to have such valves all closed for a relatively brief period of time during the switching operation. While such valves are thus closed, the pump 26 is still running and to assure a source of supply of liquid for such pump 26 during the brief interval that all of the valves are closed, the surge chamber 29 is maintained full of liquid for such purpose. Therefore, when the valves 31, 32, 33 and 34 are all closed, the pump 26 still has a source of fluid in the chamber 29 from which to draw. Then, when the valves are switched so that one of the chambers 11 and 12 is connected to the pump 26, initially the fluid will refill the tank 29 since a vacuum or reduced pressure is caused by the previous withdrawal of the liquid from the tank 29 when the valves were closed. Thus, the surge chamber 29 is maintained full, but it is partially emptied during each switching operation in the preferred form of the invention.

Although the drawing has been illustrated with the pump 20 for creating a greater pressure in the return line 15 than the fluid pressure in the pipeline P to effect the return of the slurry to the pipeline P, several other types of pressure differential creating means are also illustrated. Such other pressure differential creating means include an orifice 90 which is disposed in the pipeline P between the inlet flow line 10 and the return line 15. Such orifice 90 may take the form of a throttling valve. Such orifice 90 would of course not be used if the pump 20 were used and likewise if the orifice 90 is used, the pump 20 is unnecessary because a pressure differential is created in the pipeline by reason of the restriction of the orifice 90 so that there is a greater pressure in the fluid flowing to the left of the orifice 90 as compared to the pressure of the fluid flowing to the right of the orifice 90 whereby the slurry can be injected into the pipeline P.

Another form of pressure differential means is also illustrated in the drawings and it too is used by itself and is identified as a venturi 91 having the throat **91*a* in the usual manner. Such venturi 91 is positioned in the pipeline P and would be used by itself without the orifice 90 or the pump 20 because the pressure at the throat 91*a* of the venturi 91 is reduced as compared to the pressure on either side thereof, whereby the pressure of the fluid in the return line 15 is sufficiently great to be returned to the fluid in the pipeline P even though such fluid is under pressure. Thus, the alternate forms of pressure differential means shown in the drawings, namely, the pump 20, the orifice 90 and the venturi 91** would each be used separately and would not be used together as shown in the drawing.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. In combination with a pipeline through which fluid is flowing under pressure, an apparatus for injecting slurry into said pipeline, comprising a mixing chamber containing slurry at substantially atmospheric pressure, a first injection chamber, a second injection chamber, conduit means connecting opposite ends of each injection chamber with said pipeline and opposite ends of each injection chamber with said mixing chamber, means for establishing a pressure differential across said injection chambers, means for transferring slurry from the mixing chamber to the injection chambers, and valve means in said conduit means for directing the fluid flow between said pipelines, said mixing chamber and said injection chambers arranged so as to provide in one position of said valve means for the injection of slurry into said pipeline from one injection chamber with fluid pressure from the pipeline and block slurry from being injected into said one chamber from said mixing chamber while the other injection chamber is being filled with slurry from said mixing chamber and is being blocked from communication with said pipeline, and in another position of said valve means to provide for the injection of slurry into said pipeline from said other injection chamber with fluid pressure from the pipeline and block slurry from being injected into said other chamber from said mixing chamber while said one injection chamber is being filled with slurry from said mixing chamber and is being blocked from communication with said pipeline.

2. The structure set forth in claim 1, including means for controlling the operation of said valve means to alternately effect the filling of said one injection chamber with slurry and the injection of the slurry from said other injection chamber, whereby repeated injections of the slurry is effected from each injection chamber separately.

3. In combination with a pipeline through which fluid is flowing under pressure, an apparatus for injecting slurry into said pipeline, comprising a mixing chamber containing slurry at substantially atmospheric pressure, a first injection chamber, a second injection chamber, conduit means connecting opposite ends of each injection chamber with said pipeline and opposite ends of each injection chamber with said mixing chamber, means for establishing a pressure differential across said injection chambers, means for transferring slurry from the mixing chamber to the injection chambers, and valve means in said conduit means for alternately establishing fluid communication between each injection chamber and the mixing chamber while blocking communication between the injection chamber and pipeline and between each injection chamber and the pipeline while blocking communication between the injection chamber and mixing chamber whereby the injection chambers are alternately operating at substantially the fluid pressure in the pipeline and at the substantially atmospheric pressure of the mixing chamber.

4. An injection apparatus for injecting slurry into a pipeline comprising; a closed injection chamber; an outlet from the chamber adapted to be connected to a pipeline; a slurry tank connected to the chamber; pump means in fluid communication with the chamber at its extremity remote from the connection between the slurry tank and the chamber for drawing clear fluid from the chamber to thereby draw slurry from the tank into the chamber; conduit means connecting the pump means and tank to deliver fluid from the pump means to the tank; means including an inlet in the chamber connected to a source of fluid for introducing clear fluid into the chamber to flush slurry therefrom and provide clear fluid for the next cycle of operation of the apparatus; and valve means controlling the introduction of clear fluid into the chamber, and slurry into the chamber, and controlling the outlet; said valve means preventing introduction of clear fluid into the chamber and flow through the outlet while slurry is being sucked into the chamber and preventing flow from the chamber to the slurry tank while slurry in the chamber is being replaced by clear fluid.

5. The apparatus of claim 4 wherein operation of the valve means is timed to provide withdrawal from the chamber of a predetermined volume of clear fluid less than the volume of the chamber to prevent slurry from reaching the pump.

6. An injection apparatus for injecting slurry into a pipeline comprising, a closed injection chamber, a valve controlled inlet and a valve controlled outlet at opposite extremities of the chamber, conduit means connecting said inlet and outlet of the chamber to a pipeline through which clear fluid is flowing under pressure at spaced points, means providing line pressure at the inlet of the chamber greater than the pressure of the pipeline at the outlet connection to induce flow through the chamber, a slurry tank, means connecting the tank to one end of the chamber through a valved connection, suction pump means, means connecting the pump means with the chamber at its extremity remote from the connector with the slurry tank for drawing clear fluid from the chamber to thereby draw slurry from the tank into the chamber, means connecting the outlet of said pump to the tank, valve means controlling flow of fluid to the suction pump, said several valve means preventing flow through the inlet and outlet of the chamber while slurry is being sucked into the chamber and preventing flow from the chamber to the slurry tank and pump while the inlet and outlet valve means are open and slurry in the chamber is being flushed out by clear liquid from the pipeline.

7. The apparatus of claim 6 wherein the pump and valve means controlling the inlet to the chamber and flow of fluid to the pump are controlled by timer means which closes the valve controlling flow to the pump and opens the inlet from the pipeline when a predetermined amount of clear fluid has been withdrawn from the chamber and after a flushing period closes the inlet and outlet valves and opens the valve controlling flow to the pump whereby the pump is never operating against the pressure in the pipeline.

8. The method of injecting slurry into a pipeline under pressure without passing the slurry through a pump comprising, the steps of filling a closed chamber with clear fluid, replacing the clear fluid with slurry by establishing fluid communication between the chamber and a source of slurry and withdrawing clear liquid from the chamber at a point remote from the point of entry of slurry with a suction pump until a predetermined volume of clear liquid has been removed, and then introducing clear fluid into the chamber to drive slurry from the chamber into a pipeline and to provide clear liquid in the chamber for the next cycle of operation and mixing the withdrawn clear liquid with solid filter material to provide slurry for the next cycle of operation.

9. The method of injecting slurry into a pipeline under pressure without passing the slurry through a pump comprising, the steps of filling a closed chamber with clear fluid, replacing the clear fluid with slurry by establishing fluid communication between the chamber and a source of slurry and withdrawing clear liquid from the chamber at a point remote from the point of entry of slurry with a suction pump, then introducing clear fluid into the chamber to drive slurry from the chamber into a pipeline and to provide clear liquid in the chamber for the next cycle of operation, and mixing the withdrawn clear liquid with solid filter material to provide slurry for the next cycle of operation.

10. The method of injecting slurry into a pipeline under pressure without passing the slurry through a pump comprising the steps of, filling a closed chamber with clear liquid from the pipeline, isolating the chamber from the pipeline and connecting the chamber to a source of slurry, withdrawing clear liquid from the chamber at a point remote from the point of entry of slurry with a suction pump until a predetermined volume of clear liquid has been removed, connecting the chamber with the pipeline to introduce clear liquid from the pipeline into the chamber and displace the slurry therefrom and introducing the slurry into the pipeline at a point of lesser pressure than the pressure of the driving clear fluid and mixing the withdrawn clear liquid with solid filter material to provide slurry for the next cycle of operation.

11. The method of injecting slurry into a pipeline under pressure without passing the slurry through a pump comprising the steps of, filling a closed chamber with clear fluid from the pipeline under line pressure, isolating the chamber from the pipeline and connecting the chamber to a source of slurry, withdrawing clear liquid from the chamber at a point remote from the point of entry of slurry with a suction pump until a predetermined volume of clear liquid has been removed, connecting the chamber with the pipeline to introduce clear liquid from the pipeline into the chamber and displace the slurry therefrom, and introducing the slurry into the pipeline at a point downstream of and at a lesser pressure than the point from which the driving fluid is obtained and mixing the withdrawn clear liquid with solid filter material to provide slurry for the next cycle of operation.

12. An injector apparatus for injecting slurry into a pipeline comprising; a closed injection chamber; a slurry tank; means providing an inlet and an outlet in one end of said chamber; means including a check valve connecting said inlet with said slurry tank to receive slurry therefrom and preventing backflow of said slurry to said slurry tank; means including a check valve adapted to connect the said outlet to a pipeline to introduce slurry thereto and prevent backflow through said means to the injector chamber; and means for alternately withdrawing fluid from said chamber to suck slurry into the chamber and to drive slurry from the chamber through the outlet with a charge of fluid including, a suction pump connected to the other end of said chamber through conduit means and providing a suction on said chamber to withdraw fluid therefrom to suck fluid from said tank into said chamber, conduit means connecting the outlet of said suction pump with said slurry tank, a second pump connected to a source of fluid and to the other end of said chamber and delivering fluid to said chamber to drive slurry through said outlet, and means for controlling flow of fluid to and from said pumps including valve means and timing means effecting alternate suction of fluid from said chamber and introduction of fluid from said source into said chamber to expel slurry therefrom.

13. An injection apparatus for injecting slurry into a pipeline comprising, a pair of closed injection chambers, an outlet from each chamber adapted to be connected to a pipeline, a slurry tank connected to each chamber, pump means in fluid communication with each chamber at their extremities remote from their connections with the slurry tank for drawing clear fluid from the chambers to thereby draw slurry from the tank into the chambers, conduit means interconnecting the pump means and tank to deliver fluid from the pump means to the tank, means including an inlet in each chamber and connected to a source of fluid for introducing clear fluid into each chamber to flush slurry therefrom and provide clear fluid for the next cycle of operation of each chamber, valve means controlling the introduction of clear fluid into each chamber and slurry into each chamber and controlling the outlet of each chamber, timing means controlling operation of said valve means to withdraw fluid from one chamber while a charge is being introduced into the other chamber and to periodically reverse the chambers from which fluid is being withdrawn and into which fluid is being introduced to provide for substantially continuous output of slurry, said valve means preventing introduction of clear fluid and flow through the outlet of each chamber while slurry is being sucked into each chamber and preventing flow from the chambers to the slurry tank while slurry in each chamber is being replaced by clear fluid.

References Cited in the file of this patent

UNITED STATES PATENTS

| | | |
|---|---|---|
| 1,645,378 | Fender | Oct. 11, 1927 |
| 2,246,594 | Kinsella | June 24, 1941 |
| 2,486,650 | Hepp et al. | Nov. 1, 1949 |
| 2,584,395 | Marvel | Feb. 5, 1952 |
| 2,704,034 | Jones | Mar. 15, 1955 |
| 2,733,814 | Booth | Feb. 7, 1956 |